United States Patent [19]

Erickson et al.

[11] Patent Number: 4,677,539
[45] Date of Patent: Jun. 30, 1987

[54] DC TO THREE PHASE SWITCHED MODE CONVERTERS

[75] Inventors: Robert W. Erickson, Boulder, Colo.; Iftikar A. Khan, Lalazar Colony, Pakistan

[73] Assignee: University Patents, Inc., Westport, Conn.

[21] Appl. No.: 860,405

[22] Filed: May 7, 1986

[51] Int. Cl.[4] ............................................. H02M 7/538
[52] U.S. Cl. ..................................... 363/132; 363/41; 363/98
[58] Field of Search ................. 363/41, 124, 132, 136, 363/137, 98

[56] References Cited

U.S. PATENT DOCUMENTS

| | | | |
|---|---|---|---|
| 3,919,619 | 11/1975 | Corry . | |
| 4,184,197 | 1/1980 | Cuk et al. | 363/16 |
| 4,204,264 | 5/1980 | Lipman | 363/71 |
| 4,276,589 | 6/1981 | Okawa et al. | 363/71 |
| 4,352,154 | 9/1982 | Reiber | 363/123 |
| 4,367,522 | 1/1983 | Forstbauer et al. | 363/137 |
| 4,458,194 | 7/1984 | Geppert et al. | 318/811 |
| 4,491,768 | 1/1985 | Slicker | 318/139 |
| 4,609,983 | 9/1986 | Braun | 363/132 |

FOREIGN PATENT DOCUMENTS 1518934 7/1978 United Kingdom ................ 363/137

OTHER PUBLICATIONS

Cuk, Slobodan et al., "A New Optimum Topology Switching DC-to-DC Converter", pp. 311-330 of *Advances in Switched Mode Power Conversion*, Middlebrook & Cuk, vol. 2, 1983.

Ngo, Khai et al., "A New Flyback DC-to-Three Phase Converter with Sinusoidal Outputs", IEEE Power Electronics Specialists Conference 1983, pp. 377-388.

Barzegar, Farhad et al., "a New Switched-Mode Amplifier Produces Clean Three Phase Power", Proc. Ninth International Solid State Power Conversion Conference (Powercon 9), pp. E3.1-E3.15, Jul. 1982.

Variable Frequency Three Phase Current Source Inverter by R. Simard et al. IEEE-IAS 1981 Annual Meeting, 5-9 Oct. 1981, pp. 839-841.

*Primary Examiner*—Peter S. Wong
*Assistant Examiner*—Judson H. Jones
*Attorney, Agent, or Firm*—David N. Koffsky

[57] ABSTRACT

A dc to three phase ac switched mode converter is described wherein a six switch bridge is provided to interconnect the dc source to a three-phase load. A plurality of dc sources are described, each of which employs an inductor/capacitor combination for energy storage, which stored energy is subsequently applied to the output load. The stored energy is delivered by connecting the capacitor across two legs of the three-phase load, while assuring that the third leg is invariably short-circuited back upon itself. As a result, three of the six switches in the bridge are closed at any instant to prevent any current interruption in the load.

9 Claims, 12 Drawing Figures

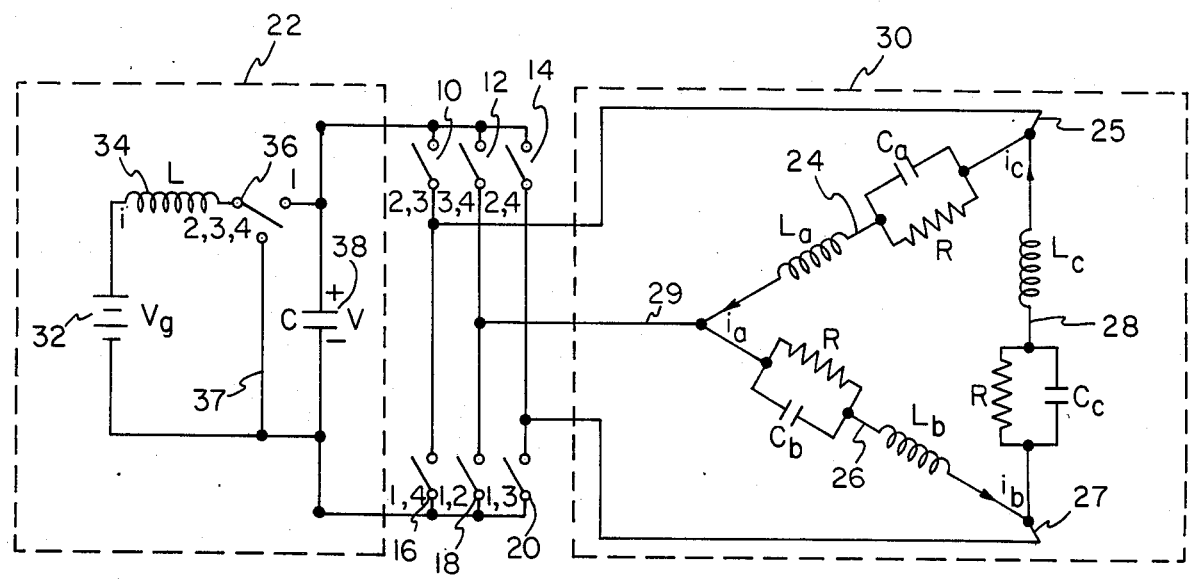
Fig. 1
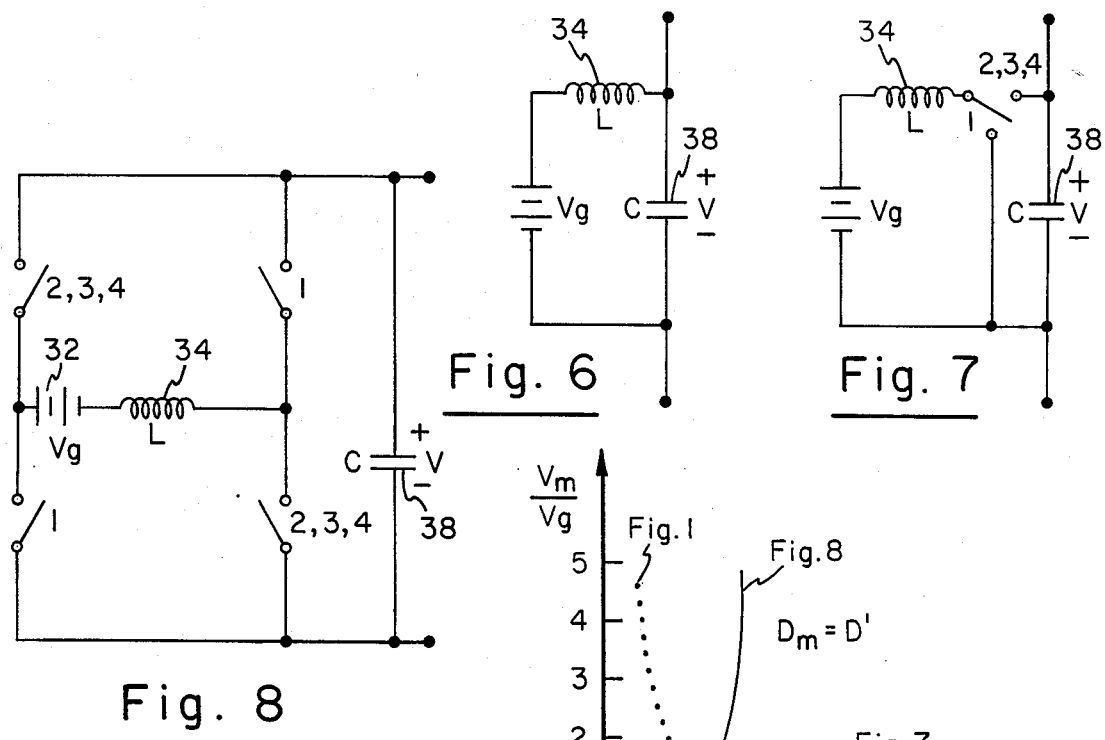
Fig. 6
Fig. 7
Fig. 8
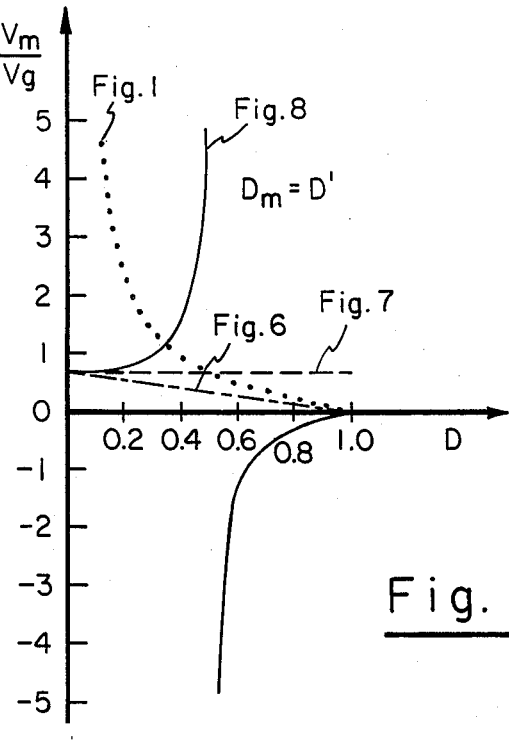
Fig. 10
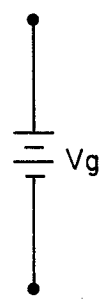
Fig. 9

(a)

(b)

DC TO THREE PHASE SWITCHED MODE CONVERTERS

FIELD OF THE INVENTION

This invention relates to a power electronics and more particularly to switched-mode converters having non-pulsating input and output currents.

BACKGROUND OF THE INVENTION

The rapid advances in the development of larger and faster semiconductor power switches, such as the gate turn-off thyristor, are resulting in increasing use of electronic systems in the processing of ac and dc power, in new applications and with new performance requirements which previously were impractical. Examples of this include the interfacing of dc alternative energy sources (such as fuel cells or solar arrays) to the ac line, the supply of dc power in Navy shipboard applications, conditioning of variable frequency power from wind generators for the ac line, the variable speed control of ac motors, the dc transmission of electrical power, and the construction of uninterruptible power supplies.

At higher power levels, three-phase ac systems are invariably used, and hence at least one port of any high-power switched-mode converter must interface a three-phase ac system. So far, the most exploited application area of three-phase ac converters is the variable speed control of ac motors. The most objectionable feature of converters presently used in these drives is the generation of output frequency harmonics. These harmonics lead to lower power factors, higher losses, distorted line voltage waveforms, pulsation torques in induction motors, and radiated electromagnetic interference. Another problem associated with three-phase ac converters is their inability to provide variable voltages above the dc input value.

Attempts to develop converters with more accurate control of converter voltage and current waveforms have resulted in the discovery of a number of dc to three-phase switched mode converters. Ngo, et al, in an article entitled "A New Flyback DC-To-Three-Phase Converter With Sinusoidal Outputs", IEEE Power Electronics Specialists Conference, 1983 Record, pp 377-388, describe a poly-phase converter which employs an energy transfer inductor and seven transistor/diode pairs to generate a sinusoidal output. However, since the converter produces pulsating output currents, a capacitor filter network is required to obtain a "clean" output.

The problems of pulsating input and output currents are known in the art. Various dc to dc converter designs have been proposed to avoid such a phenomenon. In U.S. Pat. No. 4,184,197 to Cuk, at al, a dc to dc switching converter is described which employs a pair of inductances, one in series with the input source and the other in series with the output load. An energy transfer device (capacitor) is switchably controlled to transfer the input energy to the output. That circuit, as well as others, are further described by Cuk, et al, in "A New Optimum Topology Switching DC-to-DC Converter" appearing in "Advances in Switched Mode Power Conversion", Middlebrook & Cuk, Vol 2, 1983, pp 311-330. Other dc-to-dc converter designs which avoid the pulsating terminal current phenomenon are described by Erickson in "Synthesis of Switched-Mode Converters", Power Electronics Specialists Conference, 1983 Record, pp. 9-22. While non-pulsating currents have been obtained in dc to dc converters, it has not been heretofore known how to efficiently obtain this property in a three-phase converter.

Accordingly, it is an object of this invention to provide a class of three-phase, switched-mode converters which exhibit non-pulsating terminal currents.

It is a further object of this invention to provide three-phase switched-mode converters which employ minimal component counts in order to achieve the above-mentioned characteristics.

Still another object of this invention is to provide a variable frequency, three-phase switched-mode converter which is adapted to generate output voltages both above and below the dc input value.

SUMMARY OF THE INVENTION

In accordance with the aforestated objects, a six switch bridge is provided to interconnect a dc source to a three-phase output load. A plurality of dc sources are described, each of which employs an inductor/capacitor combination for energy storage, which stored energy is subsequently applied to the output load. The stored energy is delivered by connecting the capacitor across two legs of the three-phase load, while assuring that the third leg is invariably short-circuited back up itself. As a result, three of the six switches in the bridge are closed at any instant to prevent any current interruption in the load.

BRIEF DESCRIPTION OF THE DRAWINGS

FIG. 1 is a schematic diagram of one form of the invention.

FIGS. 6, 7, 8, and 9 are schematic diagrams of other forms of the power input portion of the invention.

FIG. 10 is a plot which shows how variations in the dc duty ratio D affect the ratio of input to maximum peak output voltage of the invention.

DETAILED DESCRIPTION OF THE INVENTION

Figure 2:
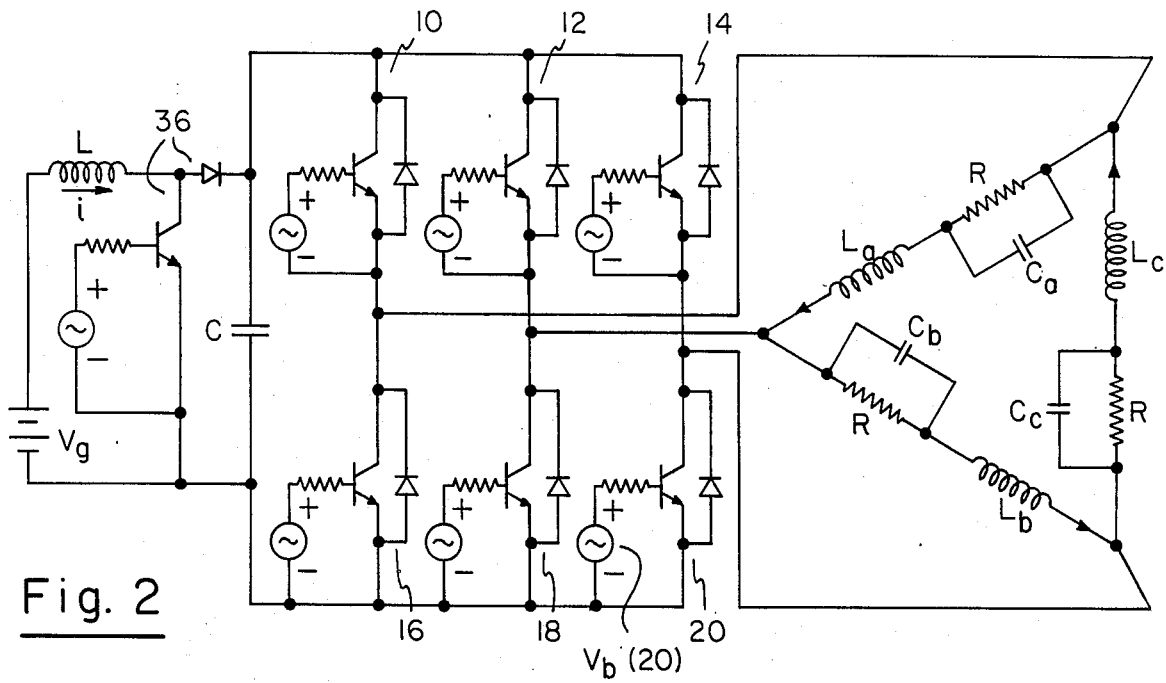
FIG. 2 is a realization of the converter of FIG. 1 by using diodes and transistors.

Each of the converters, to be hereinafter described, operates by repetitively switching between four topologies (each existing during a "switching interval") during each switching period $T_s$. The four switching intervals are numbered 1-4. These topologies are formed by different connections of an input inductor, capacitor, and the reactive legs of a three-phase load. Each topology is connected for an interval which is a fraction of the switching period; these fractions are hereinafter referred to as "duty-ratios".

A set of four duty-ratios $d_1$–$d_1$–$d_4$ which result in converter operation with desirable characteristics are defined as follows:

$$d_1 = D \qquad \text{(i)}$$

$$d_2 = (D' + D_m \cos wt)/3 \qquad \text{(ii)}$$

$$d_3 = [D' + D_m \cos(wt - 120°)]/3 \quad \text{(iii)}$$

$$d_4 = [D' + D_m \cos(wt + 120°)]/3 \quad \text{(iv)}$$

where

D = dc duty ratio (a non-negative number less than 1 which is chosen as the dc offset)

$D_m/3$ = amplitude of the sinusoidal component of duty ratios $D' = 1 - D$ w = ac output angular frequency The above duty ratio expressions indicate that for each $T_s$, individual duty ratios change in relation to each other in a sinusoidal manner. Thus, while the switching periods ($T_s$) are preferably constant in length of time, each duty ratio $d_2-d_4$ changes for each $T_s$. In the preferred embodiments of this invention, the switching period $T_s$ is substantially smaller than the period of the ac output ($2\pi/w$) (for example, 50 KHz). It will be seen that the output voltage waveforms of the converters to be hereinafter described can be controlled by varying the duty ratios. In particular, the ac output frequency and amplitude can be changed by variation of the constants D, $D_m$, and/or w.

Referring now to FIG. 1, there is shown a schematic diagram of a preferred embodiment of the invention. Switches 10, 12, 14, 16, 18, and 20 (shown schematically) are connected in a bridge configuration and are adapted, when closed to connect power input circuit 22 to one or more legs 24, 26 and/or 28 of three-phase load 30 via nodes 25, 27, and 29. As aforestated, each switching period $T_s$ is divided into four switching intervals 1-4. Adjacent each switch is an indication of when the respective switch is closed. For instance, switch 10 is closed (i.e. "conductive") during switching intervals 2 and 3 but is open (i.e. "non-conductive") during intervals 1 and 4. From an examination of the switch closure indication, it can be realized that invariably in energy switching interval three of the six switches in the bridge are closed thereby assuring that when energy is delivered to two branches of three-phase load 30, the other branch is short-circuited upon itself. This prevents any interruption in the currents to the load and avoids pulsations.

Power input circuit 22 includes dc source 32 which is connected in series with inductor 34 and switch 36. Switch 36 is single pole, double throw and alternately shorts, (via conductor 37) dc source 32 and inductor 34, or connects them across capacitor 38. As can be seen, switch 36 connects dc source 32 and inductor 34 across capacitor 38 only during switching interval 1. Note, however, that there is no interruption in the current flowing through inductor 34 during any of the four switching intervals—thus preventing any current pulsation at the cobverter's power input.

Figure 3:
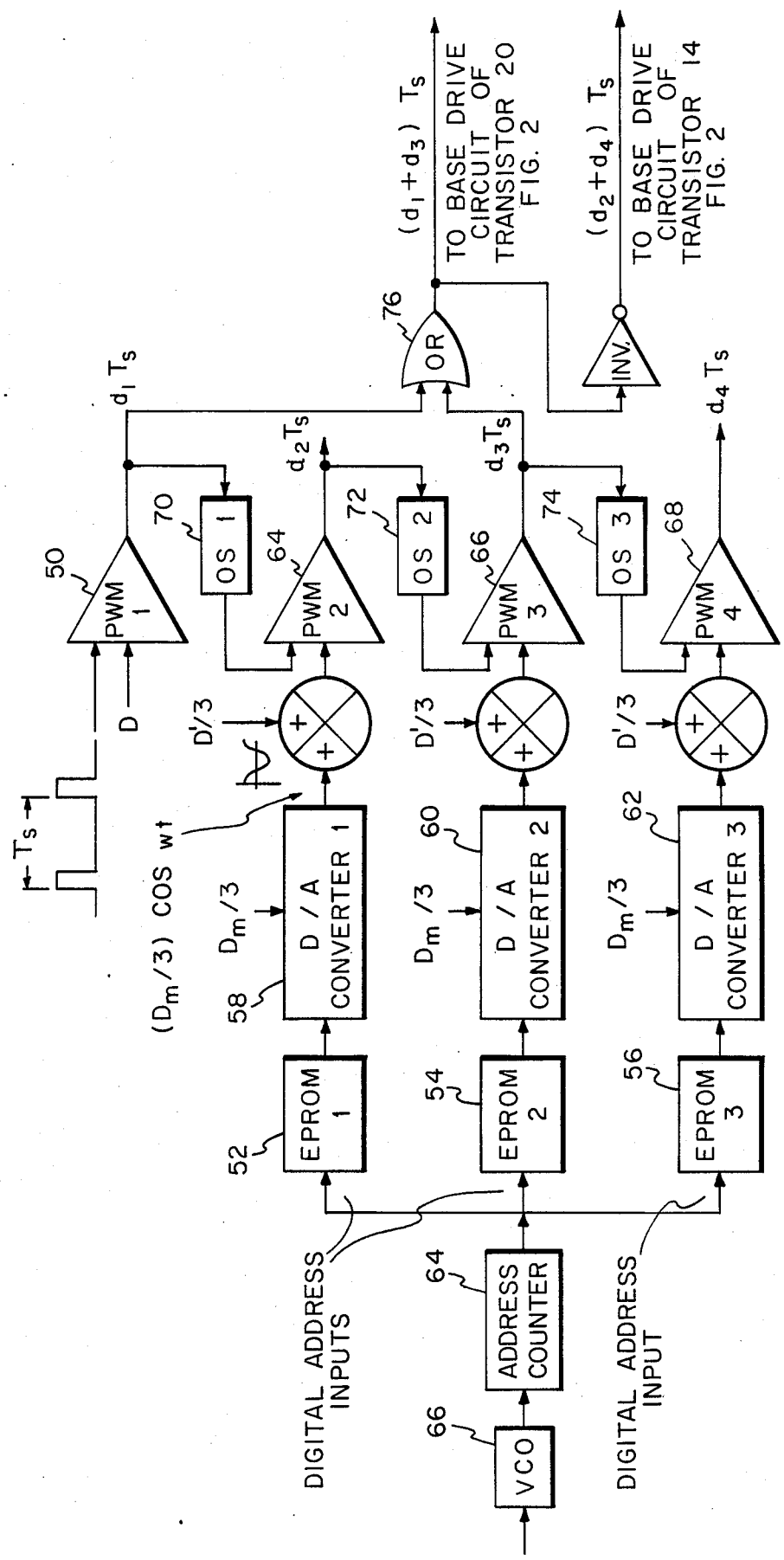
FIG. 3 is a block diagram of the circuit for controlling the switches of the converters of FIGS. 1 and 2.

Referring to FIG. 2, a more detailed circuit diagram of the converter of FIG. 1 is shown with each of the switches shown in a semiconductor configuration. Note that switch 36 actually comprises a diode-transistor combination wherein the diode is non-conductive when the transistor is in its "on" state and vice-versa. The input to each semiconductor switch is the output of a control circuit. While there are many ways to realize the control circuit, one functional diagram of such a circuit is shown in FIG. 3. This circuit provides the necessary signals to the switches to cause them to be either conductive or non-conductive during the various switching intervals; the durations of these switching intervals being determined by the duty-ratios.

Figure 4:
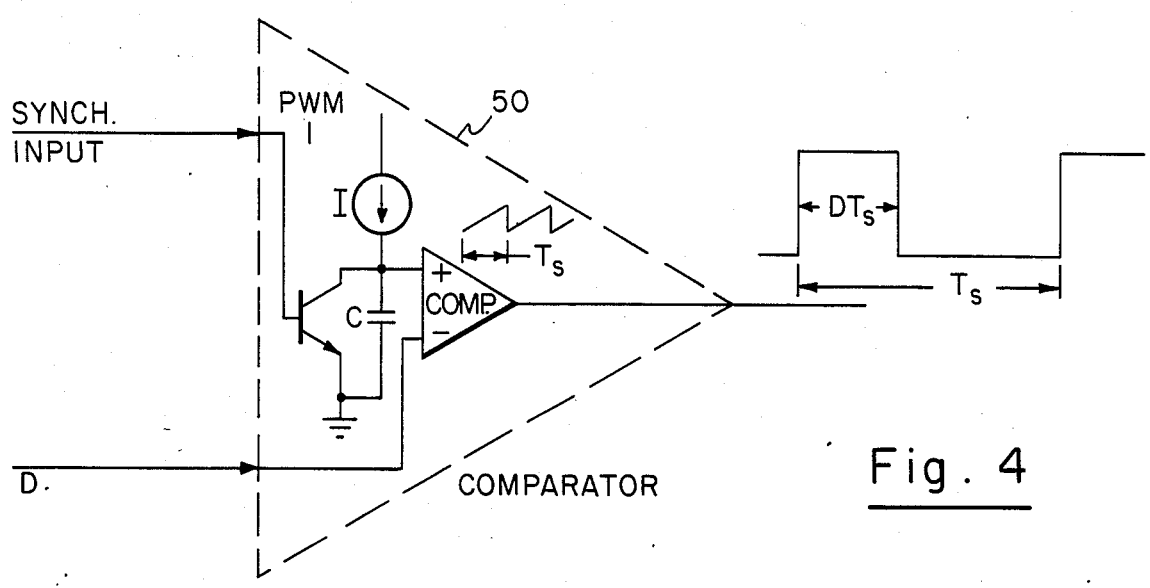
FIG. 4 is a schematic diagram of a pulse width modulator.

The duty-ratio $d_1 = D$ is obtained from a pulse width modulator 50. Such circuits are available commercially, e.g. UC 3525 Regulating Pulse Width Modulator available from the Unitrode Corporation, Lexington, Mass. A functional diagram of the modulator is shown in FIG. 4. The modulator produces a quasi-square wave when a voltage is applied at its input. The pulse width of the output wave, which is equal to the duration of the first switching interval $d_1T_s$, is controlled by altering the voltage at the input of the modulator.

Referring again to FIG. 3, the signals which are required for the sinusoidal modulation of duty-ratios $d_2$, $d_3$, and $d_4$ are produced by three erasable programmable read-only memories (EPROMs). EPROMs 52, 54 and 56 are connected to analog-to-digital converters 58, 60 and 62 and are programmed to provide output signals cos wt, cos (wt−120°), and cos (wt+120°), respectively, when provided with the proper sequence of addresses at their digital inputs. The peak output voltage amplitude of the three D/A converters is controlled by controlling the voltage at the ($D_m/3$) inputs of these converters. Thus, the outputs of the D/A converters 58, 60 and 62 are voltages proportional to ($D_m/3$) cos wt, ($D_m/3$) cos (wt−120°), and ($d_m/3$) cos (wt+120°), respectively.

The sequence of addresses required at the EPROM digital inputs is provided by an address counter 64. The address counter, in turn, is controlled by a voltage-controlled oscillator 66. The output frequency of voltage-controlled oscillator 66, and hence, frequency w of the D/A converter outputs is controlled by controlling the voltage at the input of oscillator 66.

Three summers are used to add a dc voltage proportional to ($D'/3$) to the three D/A converter outputs. The outputs of these summers are then voltages proportional to duty-ratios $d_2$, $d_3$, and $d_4$. These voltages are applied to the inputs of three pulse width modulators 64, 66 and 68. The outputs of the modulators are pulses whose widths are equal to the durations of the second, third, and fourth switching intervals, that is, $d_2T_s$, $d_3T_s$, and $d_4T_s$, respectively.

The four switching intervals, $d_1T_s$, $d_2T_s$, $d_3T_s$, and $d_4T_s$ should occur in the order given. That is, interval $d_2T_s$ should begin at the end of interval $d_1T_s$, interval $d_3T_s$ should begin at the end of interval $d_2T_s$, and so on. Three one-shots, 70, 72 and 74 are used to achieve this order of occurrence of the switching intervals. These on-shots trigger at the negative-going edges of their input signals. Consider, for example, the one-shot 70. The input of this one-shot is the output of modulator 50; this input is a quasi-square wave of pulse-width $d_1T_s$. Therefore, this one-shot produces an output pulse at the end of the first switching interval. The application of this output pulse to the synch. input of modulator 64 begins the second switching interval. Thus, the second switching interval begins at the end of the first switching interval. Other one-shots work in the same manner as described above for one shot 70.

Once all four switching intervals are obtained, the turn-on and turn-off signals for the transistors are obtained by using logic gates. Consider, for example, transistor 20 of FIG. 2. This transistor is conductive during the first and third switching intervals, and is non-conductive during the second and fourth switching intervals. Therefore, the input voltage for the base drive circuit of transistor 20 is obtained from the output of OR gate 76 (FIG. 3); the inputs to OR gate 76 are the outputs of modulators 50 and 66.

Figure 5:
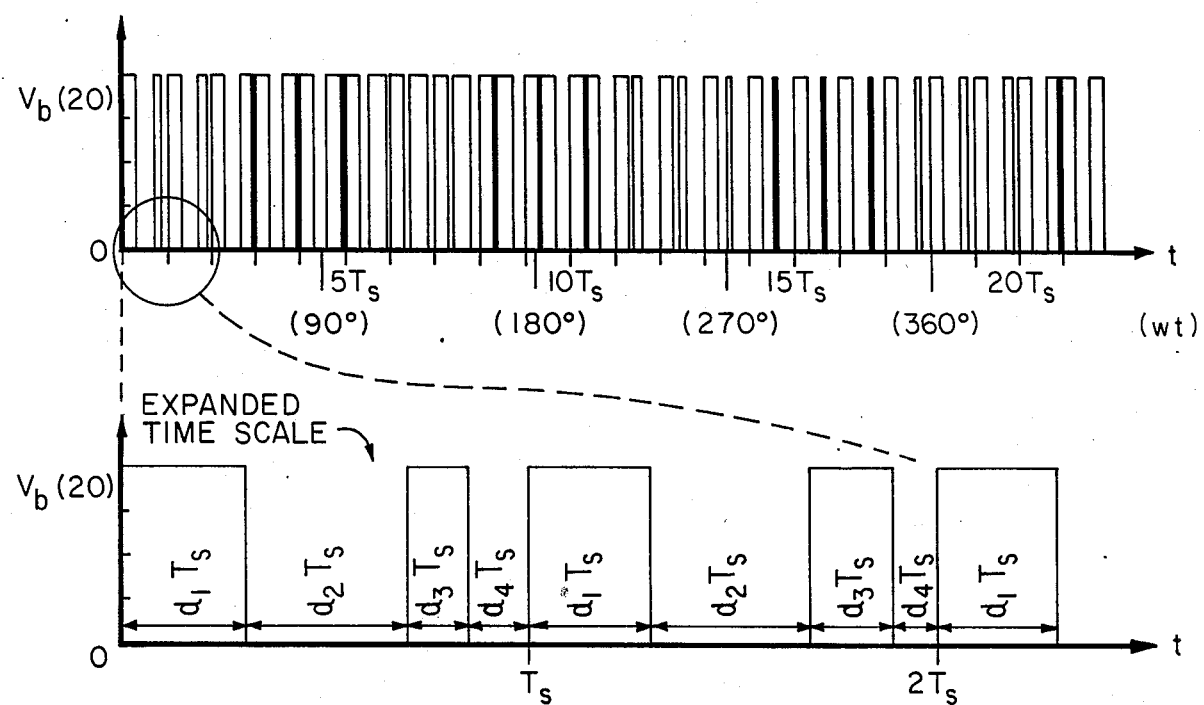
FIG. 5 is a time line chart useful in understanding the operation of the converter circuits.

As aforestated, the output of the control circuit provides the necessary signals to the switches to cause them to be either conductive or non-conductive during their respective switching intervals and for the switching intervals to be the proper durations called for by the duty ratios. In this regard see FIG. 5 wherein the switching input to the base circuit of switch 20 is shown over a plurality of switching periods. Note in the lower expanded scale, that switch 20 is caused to become conductive ("closed") during switching intervals 1 and 3 during each period $T_s$, but that its duration of closure varies during each period in accordance with the duty ratio equations above described.

Transistors 14 and 20 of FIG. 2 operate in the complementary manner; that is, transistor 14 is conductive when transistor 20 is non-conductive, and transistor 14 is non-conductive when transistor 20 is conductive. This implies that the input voltages for the base drive circuits of the two transistors are also the complement of each other. Therefore, the input voltage for the base drive circuit of transistor 14 is obtained by inverting the input voltage for the base drive circuit of transistor 20 as shown in FIG. 3.

Referring now back to FIG. 1, the operation of the dc to three-phase switched-mode converter can be understood. During switching interval 1, Capacitor 38 is charged by input current from dc voltage source 32 flowing through inductor 34. Each of switches 16, 18 and 20 are closed and switches 10, 12 and 14 are open. As a result, no voltages are applied across the legs of load 30; however, the currents induced in the respective legs of load 30 during the previous switching interval remain flowing due to the action of inductances La, Lb and Lc.

At the beginning of switching interval 2, switch 36 shorts the dc voltage source 32 and inductor 34; switches 10, 14, and 18 become conductive, and switches 12, 16, and 20 become non-conductive. As a result, the voltage on capacitor 38 is applied to legs 24 and 26, and leg 28 is short-circuited. The duration of this switching interval $d_2T_s$ is as defined by equation (ii). The converter operation during the remaining switching intervals proceeds in a like manner until the beginning of the next switching period when the cycle repeats itself. However, since the values evidenced in equations i–iv have changed, duty ratios $d_2$–$d_4$ will be altered accordingly.

It can be shown that the input current I and peak output voltage amplitude V for the circuit of FIG. 1 are:

$$I = (D_m^2 V_g / 2D^2 R) \qquad V = (D_m / \sqrt{3}\ D) V_g$$

Referring now to FIG. 6, an alternative power input circuit for FIG. 1 is shown wherein both inductance 34 and capacitor 38 are connected to the switching network during all four switching intervals 1-4. For this converter $$I = D_m^2 V_g / 2R \qquad V = (D_m / \sqrt{3}\ ) V_g$$

Turning to FIG. 7, another power input circuit for FIG. 1 is shown wherein inductor 34 and capacitor 38 are connected to the switching network during switching intervals 2-4 and are not connected during interval 1. In this case $$I = (D_m^2 V_g / 2D'^2 R) \qquad V = (D_m / \sqrt{3}\ D') V_g$$

FIG. 8 shows still another power input circuit for FIG. 1. However, in this case a somewhat more complex switching network is employed. It can be seen that inductor 34 and dc voltage source 32 are connected across capacitor 38 with one polarity during switching interval 1 and with an opposite polarity during intervals 2, 3 and 4. For this converter $$I = [D_m^2 V_g / 2(D' - D)^2 R] \qquad V = [D_m / \sqrt{3}\ (D' - D)] V_g$$

FIG. 9 shows an additional power input circuit in which inductor 34 and capacitor 38 are eliminated, and dc source 32 is connected directly across the two common lines. This reduces the number of reactive components in the converter at the expense of losing the desirable property of nonpulsating dc source current. For this converter $$I = D_m^2 V_g / 2R \qquad V = (D_m / \sqrt{3}\ ) V_g$$

Figure 11:
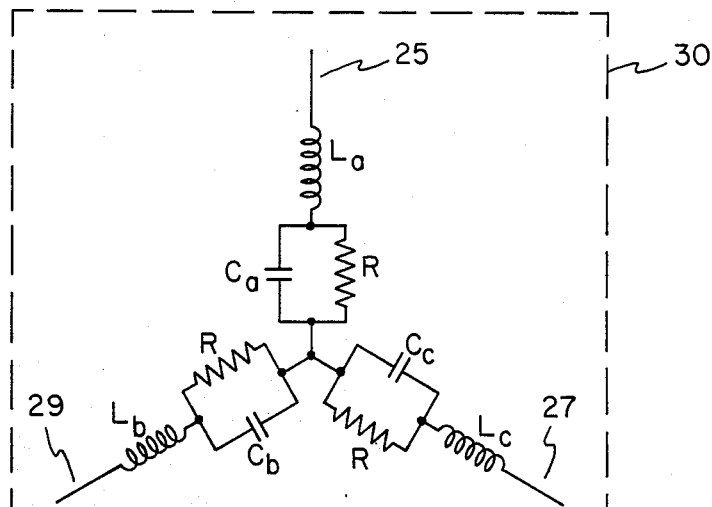
FIGS. 11a and 11b are schematic diagrams of other forms of the load portion of the invention.
Figure 11:
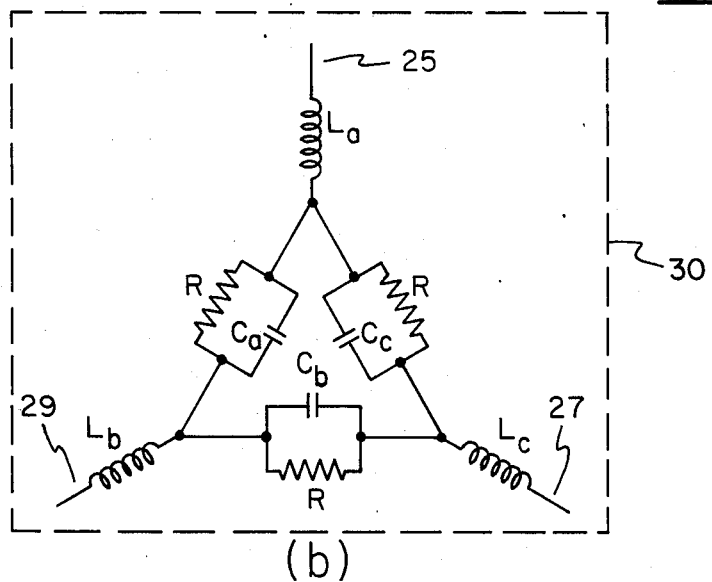

All of the above described converters are shown with delta connected three-phase loads. It should be understood that Y connected loads such as shown in FIG. 11 will also function similarly. Furthermore, the loads may be configured from actual circuit elements or, in the case of motor drives, may employ the inherent circuit features of the motor windings.

In summary, energy is delivered to the output load by connecting a capacitor across two of the load's RLC branches at any instant and the third RLC branch is short-circuited to prevent the inductor current from being interrupted. This is accomplished by three of the six switches in the three-phase bridge switch being closed at any instant. This feature results in non-pulsating currents and the harmonic-free processing of power. The most significant characteristic of the new converters, namely the harmonic-free processing of power with non-pulsating terminal current waveforms, results in higher power factors, lower losses, undistorted line voltage and current waveforms, no electromagnetic interference, and no pulsation torques in induction motors.

Other characteristics of these converters are:

(i) The output voltages of these converters have no dc offset. This characteristic is required in all present-day applications of dc-to-three-phase-ac converters.

(ii) All the converters are capable of providing variable frequency output voltages through variation of the frequency of duty-ratio modulation. This property is used in variable-speed ac motor drives.

(iii) For given values of the dc duty-ratio D, the output voltage peak amplitude V varies between zero and a maximum value $V_m$ by varying $D_m$ where $V_m$ occurs for $D_m = D'$ and is given below for the four converters:

$$V_m = (D' / \sqrt{3}\ D) V_g \text{ for converter of FIG. 1}$$

-continued $= (D'/\sqrt{3})V_g$ for converter of FIG. 6

$= (1/\sqrt{3})V_g$ for converter of FIG. 7

$= [D'/\sqrt{3}(D' - D)]V_g$ for converter of FIG. 8

The variation of $V_m/V_g$ with D is shown in FIG. 10. It can be seen that the output voltages of the converters of FIGS. 1 and 8 can vary below and above the dc input value, while those of the converters of FIGS. 6 and 7 can be varied to values only less than fifty-eight percent of the dc input value. This characteristic makes converters of FIGS. 1 and 8 suitable for ac motor drive applications which require high torques at high speeds.

We claim:

1. A switched-mode dc to three-phase converter adapted to apply balanced three-phase ac voltages to a load which comprises three legs, each leg including a node and exhibiting an inductive reactance, the combination comprising;
   first through sixth switch means, each provided with at least a first and second terminal, the first terminals of said first through third switch means connected to a common line and the second terminals of said fourth through sixth switch means connected to another common line, said second and first terminals of said first and fourth, second and fifth and third and sixth switch means respectively being connected together to form a bridge circuit;
   means connecting one each of said nodes respectively to the connection between said first and fourth, second and fifth and third and sixth switch means;
   dc power input means including a dc source, inductive means and capacitive means, said dc source and inductive means being connected in series and said capacitance means being connected between said common lines; and
   control means for controlling the conductivity state of each of said switch means, said control means adapted to operate each said switch means at a rate faster than the ac output frequency, and to invariably, during each switching interval, assure that each node is either connected to one or another common line so that no node sees an open circuit.

2. The invention as defined in claim 1 further including seventh switch means for selectively coupling said inductive means and dc source to said capacitive means.

3. The invention as defined in claim 2 wherein said control means is adapted to operate each said switch means at least once in each of four switching intervals during a switching period $T_s$.

4. The invention as defined in claim 3 wherein each switch means is closed (c) in accordance with the following schedule of switching intervals or in the case of said seventh switch means, couples said inductive means and dc source to said capacitive means:

|  | Switching Interval | | | |
|---|---|---|---|---|
|  | 1 | 2 | 3 | 4 |
| first switch means |  | c | c |  |
| second switch means |  |  | c | c |
| third switch means |  | c |  | c |
| fourth switch means | c |  |  | c |
| fifth switch means | c | c |  |  |
| sixth switch means | c |  | c |  |
| seventh switch means | c |  |  |  |

5. The invention as defined in claim 4 wherein said seventh switch means couples said inductor means and dc source to said capacitive means only during said second, third and fourth switching intervals, and during said first switching interval, said seventh switch means shorts said inductor means and said dc source.

6. The invention as defined in claim 4 wherein said switch means couples said inductive means and dc source to said capacitive means with one polarity during said first switching interval and with an opposite polarity during said second, third and fourth switching intervals.

7. The invention as defined in claim 4 wherein said seventh switch means is replaced by a conductor which connects said dc source and inductive means across said capacitive means during said first through fourth switching intervals.

8. The invention as defined in claim 3 wherein said first through sixth switching means connect all said nodes together during one switching interval and subsequently in each of three following switching intervals, connect two of said reactive legs across said common lines while short circuiting a third said reactive leg.

9. The invention as defined in claim 8 wherein the duty ratios of closure of said switch means during four successive switching intervals is defined by equations i–iv as follows:

$$d_1 = D \qquad \text{(i)}$$

$$d_2 = (D' + D_m \cos wt)/3 \qquad \text{(ii)}$$

$$d_3 = [D' + D_m \cos (wt - 120°)]/3 \qquad \text{(iii)}$$

$$d_4 = [D' + D_m \cos (wt + 120°)]/3 \qquad \text{(iv)}$$

* * * * *